United States Patent [19]

Oshima et al.

[11] Patent Number: 5,532,068
[45] Date of Patent: Jul. 2, 1996

[54] RESIN COMPOSITE AND GASKET

[75] Inventors: Masabumi Oshima; Yoshiyuki Watanabe, both of Nagoya, Japan

[73] Assignee: Mitsubishi Chemical MKV Company, Tokyo, Japan

[21] Appl. No.: 377,834

[22] Filed: Jan. 25, 1995

[30] Foreign Application Priority Data

Jan. 25, 1994 [JP] Japan .................................. 6-006263
Feb. 21, 1994 [JP] Japan .................................. 6-022829
Nov. 10, 1994 [JP] Japan .................................. 6-276614

[51] Int. Cl.$^6$ .......................... B32B 27/08; B32B 27/30; B32B 27/22
[52] U.S. Cl. ............................................. 428/520; 426/522
[58] Field of Search .................................. 524/296, 297, 524/314, 569; 525/233, 235, 239; 428/520, 522

[56] References Cited

FOREIGN PATENT DOCUMENTS 62-11788  1/1987  Japan .
4-82034  12/1992  Japan .

*Primary Examiner*—Peter A. Szekely
*Attorney, Agent, or Firm*—Oblon, Spivak, McClelland, Maier & Neustadt

[57] ABSTRACT

A resin composite having a soft resin composition combined to a hard resin, wherein the soft resin composition consists essentially of 100 parts by weight of a vinyl chloride resin, from 10 to 400 parts by weight of a rubber material containing at least 30 wt % of a tetrahydrofuran-insoluble rubber component and from 30 to 300 parts by weight of a plasticizer, and the hard resin consists of a chlorinated vinyl chloride resin, or a mixture of a chlorinated vinyl chloride resin and a vinyl chloride resin in which the chlorinated vinyl chloride resin is in an amount of at least 20 wt %.

14 Claims, No Drawings

RESIN COMPOSITE AND GASKET

BACKGROUND OF THE INVENTION

FIELD OF THE INVENTION

The present invention relates to a resin composite made of a hard resin and a soft resin composition, which is excellent in compression set and heat distortion resistance, and a gasket made thereof.

DISCUSSION OF BACKGROUND

A soft vinyl chloride resin, vulcanized rubber or the like is used as a material for a packing, a sealing material, a gasket or the like (hereinafter generally referred to simply as a gasket) to maintain air tightness of an automobile, an electrical equipment, a building, etc. Such a gasket is formed in many cases by molding a soft vinyl chloride resin or vulcanized rubber alone into a desired shape and fixing the molded product to a supporting substrate of a metal or a hard synthetic resin by a screw or an adhesive.

Further, in recent years, an invention of a method for producing a gasket by coextrusion of a soft resin with a hard vinyl chloride resin instead of a metal substrate, has been proposed in Japanese Examined Patent Publication No. 82034/1992. However, the hard supporting substrate here is a vinyl chloride type resin and thus poor in the heat distortion resistance. Accordingly, there is a drawback that when the gasket is used in a high temperature atmosphere, the entire gasket will deform, and the durability as the gasket is also poor.

SUMMARY OF THE INVENTION

The present inventors have conducted an extensive research with an aim to obtain a synthetic resin composite which is excellent in the heat distortion resistance and which does not lose creep resistance and compression set, even when used for e.g. a gasket. As a result, they have found that by using a chlorinated vinyl chloride resin for the hard resin portion, bonding to a soft vinyl chloride resin composition becomes easy, and the resulting composite is excellent in the heat distortion resistance without losing creep resistance and compression set and is capable of providing excellent performance as a gasket. The present invention has been accomplished on the basis of this discovery.

Namely, the object of the present invention is to provide a resin composite excellent in creep resistance, compression set and heat distortion resistance.

Thus, the present invention provides a resin composite having a soft resin composition combined to a hard resin, wherein the soft resin composition consists essentially of 100 parts by weight of a vinyl chloride resin, from 10 to 400 parts by weight of a rubber material containing at least 30 wt % of a tetrahydrofuran-insoluble rubber component and from 30 to 300 parts by weight of a plasticizer, and the hard resin consists of a chlorinated vinyl chloride resin, or a mixture of a chlorinated vinyl chloride resin and a vinyl chloride resin in which the chlorinated vinyl chloride resin is in an amount of at least 20 wt %.

DETAILED DESCRIPTION OF THE PREFERRED EMBODIMENTS

Now, the present invention will be described in detail.

The chlorinated vinyl chloride resin as the hard resin for the resin composite of the present invention is produced by a method of post chlorinating a vinyl chloride resin. The post chlorination method may, for example, be a solution method in which a vinyl chloride resin is dissolved in tetrachloroethane and chlorine gas is reacted thereto, a dry method wherein chlorine gas is reacted to a vinyl chloride resin under heating or under irradiation, a liquid chlorine method wherein chlorine gas is dissolved in a solvent under pressure and reacted with a vinyl chloride resin, or an aqueous suspension method wherein a vinyl chloride resin is suspended in a hydrochloric acid solution, chloroform is added and chlorine gas is supplied thereto. The chlorinated vinyl chloride resin to be used in the present invention may be the one produced by any one of such chlorination methods.

The chlorinated vinyl chloride resin preferably has an average degree of polymerization of the vinyl chloride resin before chlorination within a range of from 400 to 1,500 from the viewpoint of the processability for producing the resin composite. Further, the degree of chlorination after the chlorination step is preferably within a range of from 60 to 70 wt %. If the degree of chlorination is less than 60 wt %, the effect for improvement of the heat distortion resistance tends to be small, and if it exceeds 70 wt %, the processability tends to be poor.

The vinyl chloride resin to be used for the preparation of the chlorinated vinyl chloride resin may be any vinyl chloride resin which is produced by a conventional method such as suspension polymerization, bulk polymerization, fine suspension polymerization or emulsion polymerization of vinyl chloride or a mixture of vinyl chloride and a comonomer copolymerizable therewith. The comonomer may, for example, be a vinyl ester such as vinyl acetate, vinyl propionate or vinyl laurate, an acrylic acid ester such as methyl acrylate, ethyl acrylate or butyl acrylate, a methacrylic acid ester such as methyl methacrylate or ethyl methacrylate, a maleic acid ester such as dibutyl maleate or diethyl maleate, a fumaric acid ester such as dibutyl fumarate or diethyl fumarate, a vinyl ether such as vinyl methyl ether, vinyl butyl ether or vinyl octyl ether, a vinyl cyanide such as acrylonitrile or methacrylonitrile, an α-olefin such as ethylene, propylene or styrene, a halogenated vinylidene or halogenated vinyl other than vinyl chloride, such as vinylidene chloride or vinyl bromide, or a polyfunctional monomer such as diallyl phthalate or ethylene glycol dimethacrylate. Of course, the comonomer is not limited to the above-mentioned specific examples. The comonomer is usually within a range of at most 30 wt %, preferably at most 20 wt %, in the constituting components of the vinyl chloride resin.

Further, the hard resin may be a mixture of the chlorinated vinyl chloride resin with a vinyl chloride resin produced by the above-mentioned method. The mixing ratio of the chlorinated vinyl chloride resin and the vinyl chloride resin is such that the mixture contains at least 20 wt %, preferably at least 50 wt %, more preferably at least 70 wt %, of the chlorinated vinyl chloride resin. If the chlorinated vinyl chloride resin is less than 20 wt %, the effect for improvement of the heat distortion resistance tends to be inadequate. To the hard resin, various additives such as a stabilizer, a lubricant, an antioxidant, an ultraviolet absorber, a blowing agent and a pigment, may be incorporated, as the case requires.

The soft resin composition as an essential element of the present invention comprises a vinyl chloride resin, a rubber material containing at least 30 wt % of a tetrahydrofuran (hereinafter referred to as THF) insoluble rubber component and a plasticizer, as the main components.

The vinyl chloride resin is not particularly limited so long as it is produced by the above-mentioned methods. However, in consideration of the processability and moldability of the soft resin composition or the creep resistance and the heat distortion resistance of the resulting resin composite, it preferably has an average degree of polymerization within a range of from 700 to 8,000, preferably from 1,300 to 5,000, more preferably from 1,500 to 4,000.

The rubber material containing at least 30 wt % of a THF-insoluble rubber component, as one component of the soft resin composition, may be various rubbers such as acrylonitrile-butadiene rubber (nitrile rubber, or NBR), methyl methacrylate-butadiene-styrene rubber (MBS), acrylic rubber (AR), styrene-butadiene rubber (SBR), chloroprene rubber (CR), ethylene-vinyl acetate rubber (EVA), or urethane rubber (UR). It is particularly preferred to use NBR or AR. The THF-insoluble rubber component of such a rubber material can be produced by introducing a crosslinked structure of at least 30 wt %, preferably at least 50 wt %, into the rubber molecule by a method of e.g. adding a polyfunctional monomer to the polymerization system at the time of the production of the rubber or by subjecting the rubber to crosslinking treatment with an organic peroxide after the preparation of the rubber. Among them, it is particularly preferred to use the one wherein the crosslinking structure is introduced by adding a polyfunctional monomer during the preparation of the rubber material. If the THF-insoluble rubber component is less than 30 wt %, it tends to be difficult to obtain an adequate effect for improving the compression set.

Here, wt % of the THF-insoluble rubber component is the value obtained in such a manner that 0.5 g of a sample is introduced into 30 ml of THF with stirring and left at room temperature for 24 hours, then supernatant THF is removed, followed by filtration with a glass fiber filter paper, whereupon the weight of the filtration residue is measured, and the weight % is calculated therefrom.

Thus, the blend proportion of the rubber material is within a range of from 10 to 400 parts by weight, preferably from 20 to 250 parts by weight, per 100 parts by weight of the vinyl chloride resin. If it is less than 10 parts by weight, the effect for improving the compression set tends to be poor. On the other hand, if it exceeds 400 parts by weight, the molding processability tends to be poor.

By incorporating the plasticizer to the soft resin composition, the composition becomes soft, and kneading and processing can be facilitated, and the compression set will also be improved. The plasticizer is not particularly limited and may, for example, be a phthalic acid ester plasticizer such as di-2-ethylhexyl phthalate, di-n-octyl phthalate, diisodecyl phthalate, dibutyl phthalate or dihexyl phthalate; a straight chain dibasic acid ester plasticizer such as dioctyl adipate or dioctyl sebacate; a brimellitic acid ester plasticizer; an epoxy plasticizer such as epoxidized soybean oil, epoxidized linseed oil or liquid epoxy resin; or a phosphoric acid ester plasticizer such as triphenyl phosphate, trixylyl phosphate or tricresyl phosphate. These plasticizers may be used alone or in combination as a mixture of two or more of them.

The amount of the plasticizer varies depending upon the types and the amounts of the vinyl chloride resin and the rubber material and the presence or absence of the filler, but is suitably selected within a range of from 30 to 300 parts by weight, preferably from 40 to 200 parts by weight, per 100 parts by weight of the vinyl chloride resin.

When used in combination with a crosslinking agent, the soft resin composition is capable of improving the compression set property. As the crosslinking agent, a crosslinking agent commonly used for vulcanization crosslinking of usual rubber, such as an organic peroxide, an inorganic peroxide, a metal oxide, sulfur, a sulfur type vulcanization accelerator, a vulcanization promoter, a quinone-type crosslinking agent, an oxime-type crosslinking agent or an amine-type crosslinking agent, may be used, and a crosslinking accelerator may be used in combination.

The amount of the crosslinking agent is usually within a range of from 0.01 to 10 parts by weight, per 100 parts by weight of the vinyl chloride resin.

To the soft resin composition, it is advisable to add a filler within a range not to impair the compression set. The filler serves to absorb an excess amount of the plasticizer and to facilitate the kneading and molding. As such a filler, carbon black, calcium carbonate, titanium oxide, talc, aluminum hydroxide, magnesium hydroxide, hydrotalcite, clay, silica or white carbon may, for example, be mentioned. The amount of the filler is selected within a range of at most 500 parts by weight, per 100 parts by weight of the vinyl chloride resin, and taking various physical properties of the soft resin composition into consideration, it is preferably within a range of from 10 to 200 parts by weight. If the amount of the filler is too small, the effect for improving the kneading and molding properties tends to be small, and if it exceeds 500 parts by weight, the moldability tends to be poor. It is desirable to add the filter within a range not to impair the moldability, also from the economical viewpoint.

Further, by adding an acrylic resin to the soft resin composition, it is possible to improve the extrusion moldability. The acrylic resin is a resin obtained by polymerizing acrylic acid or its derivative and may, for example, be a polymer or copolymer of acrylic acid, an acrylic acid ester, acrylamide, acrylonitrile, methacrylic acid or a methacrylic acid ester. For the soft resin composition to be used in the present invention, it is particularly preferred to employ a copolymer of methyl methacrylate with an alkyl acrylate, wherein methyl methacrylate is at least 60 wt %, preferably from 70 to 90 wt %, and the alkyl acrylate is at most 40 wt %, preferably from 30 to 10 wt %.

The amount of the acrylic resin to be incorporated is usually within a range of up to 30 parts by weight, preferably from 1 to 20 parts by weight, per 100 parts by weight of the vinyl chloride resin.

Further, to the soft resin composition, various additives such as a stabilizer, a lubricant, an antioxidant, an ultraviolet absorber, a blowing agent, a flame retardant, a pigment, an impact resistance-improving agent, or a thermoplastic resin or rubber other than those described above, may be incorporated as the case requires. As the thermoplastic resin and rubber, methyl methacrylate-butadiene-styrene rubber, acrylic rubber, butadiene rubber, styrene-butadiene rubber, nitrile rubber, acrylonitrile-butadiene-styrene rubber, isoprene rubber, chloroprene rubber, ethylene-propylene rubber, ethylene-vinyl acetate, thermoplastic polyurethane, or nylon, may, for example, be mentioned.

The soft resin composition as an essential element of the present invention, can be prepared by a method wherein the vinyl chloride resin, the rubber material containing the THF-insoluble rubber component and the plasticizer as well as various other additives such as the acrylic resin or the filler, are introduced in predetermined amounts into a mixing machine or a kneading machine and then mixed and kneaded under heating to a temperature of from 100° to 230° C., preferably from 130° to 230° C. From the operational viewpoint or with a view to obtaining a uniformly kneaded composition, the soft resin composition is preferably produced by the following method. Namely, a mixture comprising the vinyl chloride resin and the plasticizer, and if necessary, the acrylic resin, is preliminarily dry-blended, and then the dry blend composition is mixed and kneaded with the rubber material containing the THF-insoluble rubber component and, if necessary, other additives such as the crosslinking agent and the filler, under heating to a temperature of from 100° to 230° C.

An apparatus to be used for mixing the above blend components, may be any apparatus so long as the components can substantially uniformly be mixed. For example, a Henschel mixer, a ribbon blender or a planetary mixer may, for example, be mentioned. To knead the mixture, an apparatus which is capable of kneading with a sharing force under heating, such as an extruder, a roll mill, a Banbury mixer or a kneader may be employed. It is particularly preferred to employ a closed type kneader such as a Banbury mixer, an intensive mixer or a pressure kneader, or a same directional twin screw extruder, whereby large kneading effects can be obtained.

The resin composite of the present invention is obtained by combining the above described hard resin and the soft resin composition. As the combining method, various methods may be employed such as a method wherein the above-mentioned soft resin composition is extruded and coated on a strip-shaped or rod-shaped extruded hard molded product, a method wherein the hard resin and the soft resin composition are co-extruded by means of a plurality of extruders and combined in the extrusion die or at its vicinity, and a method wherein molded products are produced from the hard resin and the soft resin composition, respectively, by various molding methods, and the two molded products are heat-welded or bonded by means of an adhesive.

A resin composite wherein the hard resin is formed in a strip shape and a soft resin composition is formed on the strip-shaped surface thereof or along the edge of the strip-shaped surface thereof so that they are joined to have a cross-sectional shape of letter T or letter L, i.e. a longitudinal resin composite having a strip-shaped edge of a strip-shaped molded product of the soft resin composition welded or bonded substantially at a right angle to a strip-shaped surface of a strip-shaped molded product of the hard resin, or a longitudinal resin composite having edges of strip-shaped molded products made respectively of the hard resin and the soft resin composition welded or bonded to each other in a cross-sectional shape of letter L, is useful as a gasket (inclusive of a packing and a sealing material) for a vehicle such as an automobile, an electrical equipment, a building, etc.

The resin composite of the present invention is excellent in the heat distortion resistance, since the hard portion is formed by a chlorinated vinyl chloride resin, the soft resin composition combined to the hard resin is free from heat distortion, and the excellent creep resistance and compression set of the soft resin composition are maintained. Thus, when it is used, for example, as a gasket, a packing or a sealing material, the effects can be maintained for a long period of time.

Now, the resin composition of the present invention will be described in detail with reference to Examples. However, it should be understood that the present invention is by no means restricted to such specific Examples.

EXAMPLES 1 TO 12 AND COMPARATIVE EXAMPLES 1 AND 2

Preparation of Hard Resin

A chlorinated vinyl chloride resin (CPVC) having a degree of chlorination of 64.5 wt %, obtained by chlorinating a vinyl chloride resin having an average degree of polymerization of 800, and a vinyl chloride resin (PVC-1) having an average degree of polymerization of 1,100, were mixed in the proportions as identified in Table 1. To this mixture, 3 parts by weight of a lead-type stabilizer, 5 parts by weight of calcium carbonate and 4 parts by weight of a composite lubricant were mixed. The mixture was introduced into a 20 l Henschel mixer and stirred until the resin temperature became 100° C. This mixture was extruded by a 40 mmø single screw extruder at a die temperature of 170° C. and pelletized.

Preparation of Soft Resin Composition 100 parts by weight of a vinyl chloride resin (PVC-2) having an average degree of polymerization of 2,350, 3 parts of a barium-zinc type composite stabilizer, 0.4 part by weight of a lubricant, and predetermined amounts (as identified in Table 1) of diisononyl phthalate (DINP), an acrylic resin (P551A, manufactured by Mitsubishi Rayon, methyl methacrylate/alkyl acrylate=70–90/30-10 wt %) and calcium carbonate, were mixed and stirred until the resin temperature became 105° C. whereby the mixture was dried up. To this dry blend product, predetermined amounts (as identified in Table 1) of NBR (acrylonitrile content: 30%, THF-insoluble rubber component: 89.4 wt %) or commercially available AR (THF-insoluble rubber component: 93.9 wt %) and a crosslinking agent (2,5-dimethyl-2,5-di(t-butylperoxy)hexane) were added, and the mixture was kneaded by a Banbury mixer until the resin temperature became 165° C. (in Example 5 until the temperature became 185° C.) and then sheeted by rolling and pelletized by a sheet cut method.

Molding of Resin Composite

By extruding the hard resin pellets by a 20 mmø extruder and the soft resin composition pellets by a 40 mmø extruder, a continuous co-extrusion molded product having one edge of a strip-shaped soft resin composition plate (height: 21 mm, thickness: 1 mm) welded to the surface of a strip-shaped hard resin plate (width: 10 mm, thickness: 1 mm) at a die temperature of 190° C. and having a cross section of letter T, was obtained.

With respect to the resin composite thus molded, the compression set of the soft resin composition portion was measured in accordance with JIS K6301 at a compression ratio of 50% at 100° C. for 22 hours, and the distortion property of the resin composite was evaluated as follows.

A longitudinal resin composite having a cross-sectional shape of inverted letter T, was maintained horizontally at a height of 50 mm, and the portion located at 100 mm from the free end was secured. In this state, the resin composite was maintained in an oven at 100° C. for 22 hours and then left to stand at room temperature for 30 minutes, whereupon the degree of lowering of the free end was measured, and the distortion ratio was calculated by the following formula.

Deformation ratio (%)={(50-height of the free end after the test)÷50}×100

TABLE 1

|  | Examples |  |  |  |  |  |  |  |  |  |  |  | Comparative Examples |  |
|---|---|---|---|---|---|---|---|---|---|---|---|---|---|---|
|  | 1 | 2 | 3 | 4 | 5 | 6 | 7 | 8 | 9 | 10 | 11 | 12 | 1 | 2 |
| Hard resin (parts by weight) | | | | | | | | | | | | | | |
| CPVC | 100 | 70 | 30 | 70 | 70 | 70 | 70 | 70 | 70 | 70 | 70 | 70 | 0 | 70 |
| PVC-1 | 0 | 30 | 70 | 30 | 30 | 30 | 30 | 30 | 30 | 30 | 30 | 30 | 100 | 30 |
| Soft resin composition (parts by weight) | | | | | | | | | | | | | | |
| PVC-2 | 100 | 100 | 100 | 100 | 100 | 100 | 100 | 100 | 100 | 100 | 100 | 100 | 100 | 100 |
| DINP | 90 | 90 | 90 | 90 | 115 | 90 | 90 | 90 | 90 | 90 | 90 | 90 | 90 | 90 |
| NBR | 50 | 50 | 50 | — | 220 | 30 | — | 100 | — | 25 | 15 | — | 50 | — |
| AR | — | — | — | 50 | — | — | 30 | — | 100 | 25 | — | 15 | — | — |
| Calcium carbonate | 30 | 30 | 30 | 30 | 130 | 30 | 30 | 30 | 30 | 30 | 30 | 30 | 30 | 30 |
| P551A | 5 | 5 | 5 | 5 | 5 | 5 | 5 | 5 | 5 | 5 | 5 | 5 | 5 | 5 |
| Crosslinking agent | — | — | — | — | 0.4 | — | — | — | — | — | — | — | — | — |
| Evaluation results | | | | | | | | | | | | | | |
| Compression set (%) | 46 | 45 | 46 | 42 | 31 | 55 | 54 | 40 | 39 | 44 | 66 | 65 | 48 | 78 |
| Distortion ratio (%) | 7 | 12 | 39 | 13 | 13 | 12 | 12 | 12 | 12 | 12 | 12 | 12 | 60 | 11 |

What is claimed is:

1. A resin composite having a soft resin composition combined to a hard resin, wherein the soft resin composition consists essentially of 100 parts by weight of a vinyl chloride resin, from 10 to 400 parts by weight of a rubber material containing at least 30 wt % of a tetrahydrofuran-insoluble rubber component and from 30 to 300 parts by weight of a plasticizer, and the hard resin consists of a chlorinated vinyl chloride resin, or a mixture of a chlorinated vinyl chloride resin and a vinyl chloride resin in which the chlorinated vinyl chloride resin is in an amount of at least 20 wt %.

2. The resin composite according to claim 1, wherein the chlorinated vinyl chloride resin has an average degree of polymerization of the vinyl chloride polymer before chlorination within a range of from 400 to 1,500 and a degree of chlorination within a range of from 60 to 70 wt %.

3. The resin composite according to claim 1, wherein the vinyl chloride resin used for the soft resin composition has an average degree of polymerization within a range of from 700 to 8,000.

4. The resin composite according to claim 1, wherein the rubber material is nitrile rubber or acrylic rubber.

5. The resin composite according to claim 1, wherein the soft resin composition contains a crosslinking agent.

6. The resin composite according to claim 1, wherein the soft resin composition contains a filler.

7. The resin composite according to claim 1, wherein the soft resin composition contains an acrylic resin.

8. A gasket made of a resin composite having a soft resin composition combined to a hard resin, wherein the soft resin composition consists essentially of 100 parts by weight of a vinyl chloride resin, from 10 to 400 parts by weight of a rubber material containing at least 30 wt % of a tetrahydrofuran-insoluble rubber component and from 30 to 300 parts by weight of a plasticizer, and the hard resin consists of a chlorinated vinyl chloride resin, or a mixture of a chlorinated vinyl chloride resin and a vinyl chloride resin in which the chlorinated vinyl chloride resin is in an amount of at least 20 wt %.

9. The gasket according to claim 8, wherein the rubber material is nitrile rubber or acrylic rubber.

10. The gasket according to claim 8, wherein the soft resin composition contains a crosslinking agent.

11. The gasket according to claim 8, wherein the soft resin composition contains a filler.

12. The gasket according to claim 8, wherein the soft resin composition contains an acrylic resin.

13. The gasket according to claim 8 made of the resin composite having a strip shaped edge of a strip-shaped molded product made of the soft resin composition welded or bonded on the surface of a strip-shaped molded product made of the hard resin to have a cross-sectional shape of letter T.

14. The gasket according to claim 8 made of the resin composite having strip-shaped edges of strip-shaped molded products made respectively of the hard resin and the soft resin composition welded or bonded to each other to have a cross-sectional shape of letter L.

* * * * *

UNITED STATES PATENT AND TRADEMARK OFFICE
CERTIFICATE OF CORRECTION

PATENT NO. : 5,532,068

DATED : July 2, 1996

INVENTOR(S) : MASABUMI OSHIMA, ET AL.

It is certified that error appears in the above-identified patent and that said Letters Patent is hereby corrected as shown below:

Column 3, line 53, "brimellitic" should read --trimellitic--.

Signed and Sealed this

Third Day of December, 1996

Attest:

BRUCE LEHMAN

Attesting Officer     Commissioner of Patents and Trademarks